United States Patent [19]

Jeter

[11] Patent Number: 4,644,780
[45] Date of Patent: Feb. 24, 1987

[54] SELF-SUPPORTING PIPE RUPTURE AND WHIP RESTRAINT

[75] Inventor: Howard R. Jeter, North Huntingdon, Pa.

[73] Assignee: Westinghouse Electric Corp., Pittsburgh, Pa.

[21] Appl. No.: 543,662

[22] Filed: Oct. 19, 1983

[51] Int. Cl.$^4$ ............ G01M 3/08; G21C 19/28
[52] U.S. Cl. ............ 73/40.5 R; 138/104; 138/114; 376/250; 376/292
[58] Field of Search ............ 376/250, 292, 291; 73/40, 40.5 R; 138/104, 111, 114

[56] References Cited

U.S. PATENT DOCUMENTS

| 316,967 | 5/1885 | Heber | 73/40.5 R |
|---|---|---|---|
| 3,054,741 | 9/1962 | Tatlock et al. | 376/250 |
| 3,155,595 | 11/1964 | Schluderberg | 376/250 |
| 3,186,913 | 6/1965 | Weisner | 376/292 |
| 3,702,802 | 11/1972 | Jansen | 376/280 |
| 3,818,935 | 6/1974 | Karker et al. | 376/293 |
| 3,937,255 | 2/1976 | Barner | 376/292 |
| 4,028,176 | 6/1977 | Kraupa | 376/293 |
| 4,051,892 | 10/1977 | Reinsch | 376/282 |
| 4,077,837 | 3/1978 | Schabert et al. | 376/281 |
| 4,122,436 | 10/1978 | Gmeiner et al. | 340/605 |
| 4,411,308 | 10/1983 | Koerdt et al. | 376/292 |
| 4,500,487 | 2/1985 | Christie et al. | 376/291 |

FOREIGN PATENT DOCUMENTS

| 757493 | 3/1971 | Belgium | 376/292 |
|---|---|---|---|
| 869332 | 11/1979 | Belgium | |
| 1278863 | 11/1961 | France | |
| 52-57491 | 5/1977 | Japan | 376/292 |
| 55-142230 | 6/1980 | Japan | 376/250 |
| 929785 | 6/1983 | United Kingdom | 376/292 |

Primary Examiner—Salvatore Cangialosi
Attorney, Agent, or Firm—Daniel C. Abeles

[57] ABSTRACT

A self-supporting pipe rupture and whip restraint system (10) for a process fluid pipe (12) of a nuclear reactor steam generator pressure vessel (14) includes a guard pipe (26) concentrically disposed about the process pipe (12) so as to entirely encase the process pipe (12) from the pressure vessel nozzle 18 to a terminal end fitting component (36) disposed exteriorly of the reactor facility building wall (32), the guard pipe (26) being integrally fixed to the process pipe (12) through means of the nozzle (18) and the component (36). Under postulated rupture conditions of the process pipe (12), pipe whipping of the process pipe (12) is restrained by the guard pipe (26), and the process fluid effluent from the process pipe (12) is contained within the guard pipe (26). Leak detection apparatus (50) is operatively associated with the annular space (30) defined between the process pipe (12) and the guard pipe (26) so as to detect ruptures or fractures within either the process pipe (12) or the guard pipe (26). The provision of a 90° elbow bend section (52) within the system also facilitates thermal expansion of the process pipe (12) relative to the guard pipe (26) without requiring conventional expansion joints or expansion bellows.

20 Claims, 1 Drawing Figure

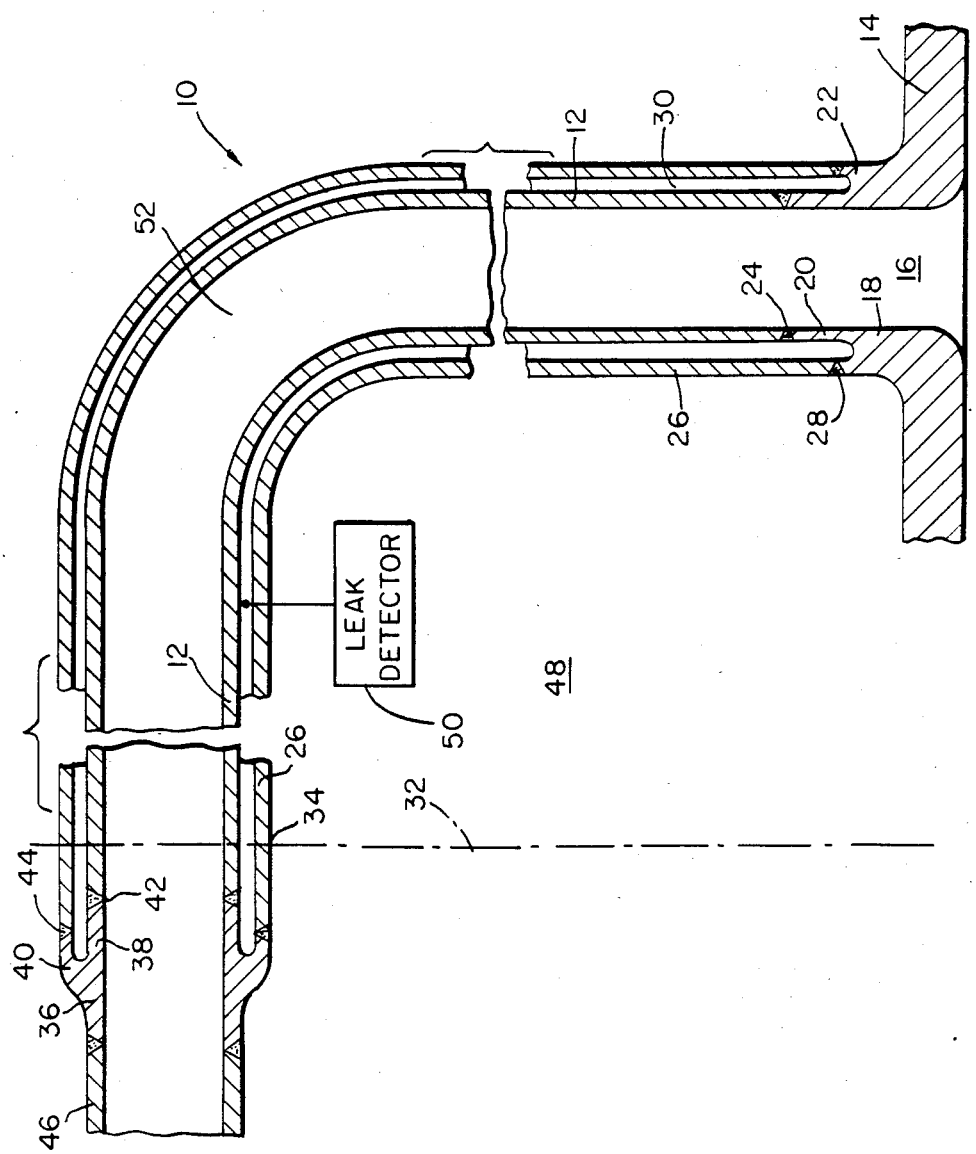

SELF-SUPPORTING PIPE RUPTURE AND WHIP RESTRAINT

BACKGROUND OF THE INVENTION

1. Field of the Invention

The present invention relates generally to nuclear reactors, and more particularly to a self-supporting pipe rupture and whip restraint system employed in conjunction with, for example, the high-pressure main steam line or process pipe of a nuclear reactor steam generator pressure vessel in order to contain the highpressure, high-temperature process steam, as well as to prevent whipping of the process pipe, under process pipe rupture conditions.

2. Description of the Prior Art

Recent requirements and regulations, issued by the Nuclear Regulatory Commission (NRC) with respect to the design or structural arrangement of nuclear reactor power plant safety grade structures, components, and systems, have decreed that rupture conditions must be postulated in connection with any one of the safety grade piping components, and that in light of such postulated rupture conditions, structural means must be incorporated into the piping systems which will render the same capable of sufficiently accommodating and adequately protecting the safety grade structures, components, and systems from the dynamic load effects, process fluid effluent, and pipe whipping attendant an exemplary or typical postulated pipe rupture. In particular, for example, the nuclear reactor primary coolant loop component, the emergency coolant systems, and the various reactor control systems must be preserved intact such that substantially normal, continued operation of the reactor facility, without any critical malfunctions, shutdowns, service interruptions, activations of the facility's elaborate back-up, redundant, or secondary safety systems, or the like, can be achieved despite the aforenoted postulated or anticipated occurrence of a piping component rupture.

The aforenoted requirements and regulations issued by the NRC were effectuated upon a retroactive basis applicable to all nuclear reactor facilities already in existence at the time that the requirements and regulations were promulgated. In addition, of course, all nuclear reactor facilities which were currently under construction at the time the requirements and regulations were issued, as well as all facilities which would be erected in the future, were subject to, and would therefore have to comply with, the criteria set forth in such requirements and regulations.

In compliance with the aforenoted requirements and regulations, massive whip restraint structures were erected within existing conventional nuclear reactor facilities. The structures comprised, for example, vertically extending truss type frameworks or towers disposed parallel to and adjacent the piping components. The structures extended, in some instances, approximately one hundred (100) feet above the facility floor or foundation, and were fabricated from large structural I-beam members, channel irons, angle irons, and the like. The structural members or components were secured about the piping components in their restraining modes by means of large clamping fasteners, or alternatively, conventional clamshell structures were employed. As may be appreciated, these massive whip restaint structures were structurally complex and extremely expensive to erect. In addition, due to the requisite size and vertical extent of these restraint structures, structural analysis of such structures dictated that the bases or foundations of the structures be substantially more massive and larger than the upper portions of the structures. This increased size within the vicinity of the tower or framework bases drastically limits or reduces the space available for other system components of the facility, in addition to hindering the ingress and egress of maintenance personnel. Still yet further, and probably most importantly, while the aforenoted tower or truss-type framework restraint structures served to restrain the piping components in whip-restraint modes, they nevertheless could not prevent the pressurized discharge of the process fluid effluent from the piping component should the same in fact experience a rupture condition. This uncontained, unconfined discharge of the process fluid would of course result in dire consequences with respect to the continued operation of the nuclear reactor facility.

Accordingly, it is an object of the present invention to provide a new and improved pipe rupture and whip restraint system.

Another object of the present invention is to provide a new and improved pipe rupture and whip restraint system which is particularly adaptable for use within a nuclear energy reactor facility.

Still another object of the present invention is to provide a new and improved pipe rupture and whip restraint system which is particularly adaptable for use in conjunction with a high-pressure, high-temperature process fluid line of a nuclear energy reactor facility.

Yet still another object of the present invention is to provide a new and improved pipe rupture and whip restraint system which overcomes the various disadvantages of the conventional pipe whip restraint systems.

Still yet another object of the present invention is to provide a new and improved pipe rupture and whip restraint system which is self-supporting, thereby eliminating the requirement for specially designed and erected auxiliary supports or restraints.

A further object of the present invention is to provide a new and improved pipe rupture and whip restraint system which is integrally fixed to, and fabricated with, the high-pressure, high-temperature process fluid pipe in conjunction with which the pipe rupture and whip restraint system of the present invention is being employed.

A yet further object of the present invention is to provide a new and improved pipe rupture and whip restraint system which can adequately sustain the dynamic forces of the process fluid and the whipping of the process fluid pipe under pipe rupture conditions.

A still further object of the present invention is to provide a new and improved pipe rupture and whip restraint system which can in fact contain the process fluid internally within the piping component system even in view of a rupture condition manifesting itself within the process fluid pipe per se.

A yet still further object of the present invention is to provide a new and improved pipe rupture and whip restraint system which is relatively simple in its structural constitution, relatively inexpensive to fabricate.

A still yet further object of the present invention is to provide a new and improved pipe rupture and whip restraint system which is easily capable of being spatially accommodated within the reactor facility so as not to hinder the spatial accommodation of other structural components within the facility, and which does not similarly hinder the ingress or egress of the various nuclear energy reactor facility maintenance personnel.

SUMMARY OF THE INVENTION

The foregoing and other objectives of the present invention are achieved through the provision of a nuclear reactor facility pipe rupture and whip restraint system for use in conjunction with a high-pressure, hightemperature process fluid pipe of the facility which comprises a guard pipe annularly surrounding, and radially spaced from, the process fluid pipe so as to completely encase the process fluid pipe. The process fluid pipe may be, for exampe, the high-pressure main steam line of the nuclear reactor steam generator pressure vessel which is welded to the pressure vessel nozzle. This weld line has been defined by means of the aforenoted Nuclear Regulatory Commission (NRC) regulations as the boundary line between the pressure vessel and the process pipe, and in accordance with additional requirements and regulations of the NRC, pipe ruptures must be postulated at all axial positions along the process pipe downstream of the aforenoted weld boundary line defined between the pressure vessel nozzle and the process pipe.

In accordance then with the present invention, not only is the high-pressure, high-temperature process fluid pipe encased within the annularly surrounding, radially spaced guard pipe, but in addition, the nozzle of the pressure vessel includes two concentric pipe end fittings extending in the downstream direction away from the pressure vessel. The radially inner fitting, which is to be mated with the process pipe so as to define the aforenoted pressure vessel-process pipe boundary line therewith, extends axially downstream in the longitudinal direction of the process pipe so as to have a length greater than the similar axial extent of the radially outer pipe fitting which is to be mated with the guard pipe. In this manner, the weld line or boundary defined between the guard pipe and its nozzle fitting will be upstream of the weld line or boundary defined between the process pipe and its nozzle fitting, downstream of which all pipe ruptures must be postulated. Consequently, as a result of the aforenoted boundary or weld line structural interrelationship, the entire process pipe, including the pressure vessel-process pipe weld line boundary, is in fact encased within the guard pipe whereby all postulated ruptures can in fact be contained. It is to be appreciated that the opposite end of the process pipe, which is connected to a further piping component disposed exteriorly of the nuclear reactor building facility, is terminated and encased within the guard pipe in a similar manner.

The guard pipe is structurally similar to the process pipe, and is fabricated from the same material as that of the process pipe. The radial thickness of the guard pipe wall is somewhat greater than that of the process pipe in order to compensate for the somewhat larger loads the diametrically larger guard pipe will naturally be subjected to, and in this manner, the guard pipe can withstand the high temperature and high pressure parameters of the process pipe fluid should the process pipe exhibit a rupture condition. In addition, not only will the high-pressure and high-temperature process fluid be fluidically contained within the guard pipe under process pipe rupture conditions, but it is noted the guard pipe exhibits sufficient strength characteristics as to adequately withstand the initial dynamic loads which may be impressed thereupon as a result of a process pipe rupture. In particular, the guard pipe can withstand the initial dynamic loads of the released process fluid, as well as the reaction forces of the intially whipping process fluid pipe. Subsequent to the initial pipe rupture condition, as a result of the containment of the process fluid within the composite process pipe-guard pipe structure or system, steady-state conditions are regained and will prevail, whereby the whipping of the inner, ruptured process pipe against the interior walls of the outer guard pipe will be substantially eliminated.

In accordance with an additional feature of the present invention, the interior annular space defined between the inner process fluid pipe and the outer guard pipe can be pressurized and monitored in accordance with conventional gas leakage techniques in order to continuously or periodically verify the fault or rupture status and integrity of the entire pipe rupture and whip restraint system of the present invention. In particular, the annular space defined between the process and guard pipes is pressurized with a leakage gas to a pressure value greater than that existing exteriorly of the guard pipe within the atmosphere of the reactor facility, yet less than that of the high-pressure process fluid within the process pipe. Should a crack, fracture, or rupture occur, for example, within a wall portion of the process pipe, then leakage of process fluid from the process pipe into the annular space defined between the process pipe and the guard pipe will occur and be detected by the gas leakage detection apparatus which will indicate an increase in the pressurized environment normally existing within the aforenoted annular space defined between the process and guard pipes. Similarly, should a crack, fracture, or rupture occur, for example, within a wall portion of the guard pipe, then leakage of the leakage gas from the annular space defined between the process and guard pipes into the reactor facility atmosphere will occur, the same being detected or indicated by the gas leakage detection apparatus which will record or indicate a decrease in the pressurized environment normally existing within the aforenoted annular space defined between the process and guard pipes. Repair or replacement of the cracked, fractured, or ruptured pipe can then of course be made in accordance with conventional techniques.

A last important unique feature of the present inventive self-support pipe rupture and whip restraint system resides in the realization that in view of the particular process fluid being transported by means of the process pipe of the rupture and restraint system of the present invention, means must be provided within the system of the present invention for accommodating the various thermal expansion and contraction operative cycles characteristic of the generation of steam within the reactor facility. In accordance with the rupture and restraint system of the present invention, the process and guard pipes are provided with at least one 90° elbow defined between the pressure vessel nozzle and the reactor facility building wall through which the downstream ends of the process and guard pipes pass. As a result of such provision of at least one 90° elbow bend within the piping components, the inner process pipe may expand longitudinally within the vicinity of the elbow bend, and thereby, in effect, expand radially outwardly relative to the outer guard pipe. In this manner, the annular space defined between the process and guard pipes accommodates the thermal expansion of the process as proves necessary, and no auxiliary means is required for accommodating such thermal expansion of the process pipe, such as, for example, conventional expansion joints, bellows, or the like.

BRIEF DESCRIPTION OF THE DRAWING

Various other objects, features, and attendant advantages of the present invention will be more fully appreciated as the same becomes better understood from the following detailed description when considered in conjunction with the accompanying drawing, wherein:

The sole FIGURE is a schematic cross-sectional view of the new and improved self-supporting pipe rupture and whip restraint system constructed in accordance with the present invention and showing the cooperative parts thereof.

DESCRIPTION OF THE PREFERRED EMBODIMENT

Referring now to the drawing, there is illustrated in the sole Figure thereof a self-supporting pipe rupture and whip restraint system constructed in accordance with the present invention and generally indicated by the reference character 10. The pipe rupture and whip restraint system 10 is adapted to be utilized in conjunction with a high-pressure main steam line or process pipe 12 of a nuclear reactor steam generator pressure vessel which is partially illustrated as at 14. The vessel 14 is provided with a process fluid outlet 16 which is defined by means of an annular nozzle member 18. More particularly, nozzle 18 is comprised of two, upstanding, concentrically disposed, radially spaced pipe end fittings 20 and 22. Radially inner end fitting 20 is adapted to be fixedly mated with the process pipe 12 along an annular, butt weld line 24, while radially outer end fitting 22 is adapted to be similarly mated with a guard pipe 26 along an annular butt weld line 28. As a result of the relatively concentric, radially spaced disposition of pipe end fittings 20 and 22, and the similarly consequent relative disposition of the process and guard pipes 12 and 26, an annular space 30 is defined between the pipes 12 and 26.

The inner process pipe 12 and the outer guard pipe 26 are seen to extend from the pressure vessel nozzle 18 to an outer wall of the reactor building facility, which is illustrated at 32. The pipes 12 and 26 extend through an aperture 34 defined within the facility wall 32, and are adapted to mate with a terminal end fitting component 36 which is structurally similar to nozzle 18 of the pressure vessel 14. In particular, terminal end fitting component 36 comprises relatively concentric, radially spaced pipe end fittings 38 and 40 which are respectively adapted to be mated with the process and guard pipes 12 and 26 along annular butt weld lines 42 and 44. The opposite end of terminal end fitting component 36 is similarly butt welded to a fluid conduit 46 for further transmission downstream from the reactor facility of the process fluid.

The process fluid being generated by and within nuclear reactor steam generator pressure vessel 14 is of course high-pressure, high-temperature steam adapted to be transmitted from vessel 14 to fluid conduit 46 by means of process pipe 12. In accordance with the aforenoted Nuclear Regulatory Commission (NRC) requirements and regulations with respect to the design or structural arrangement of nuclear reactor power plant safety grade structures, components, and systems, it has been decreed that rupture conditions must be postulated in connection with any one of the safety grade piping components, such as, for example, process pipe 12, and that in light of such postulated rupture conditions, structural means must be incorporated into the piping systems which will render the same capable of sufficiently accommodating and adequately protecting the safety grade structures, components, and systems, disposed within the vicinity of the process pipe 12 within which the rupture conditions have been postulated, from the dynamic load effects, process fluid effluent, and pipe whipping attendant and exemplary or typical postulated pipe rupture. In particular, for example, should a rupture condition occur within process pipe 12, or in other words, under postulated rupture conditions within pipe 12, the process fluid effluent must be adequately contained, and pipe whipping restrained, in order to protect the various reactor safety grade structures, components, and systems, such as, the nuclear reactor primary coolant loop component, the emergency coolant systems, and the various reactor control systems and control panels, which are disposed within the general vicinity 48 of the process pipe 12. This goal is in fact achieved in accordance with the present invention through means of the provision of the guard pipe 26 which completely encases the process pipe 12 from and beyond its boundary line 24 with pressure vessel nozzle pipe end fitting 20 all the way downstream to, and beyond, the nuclear reactor facility building line or wall 32, until process pipe 12 terminates at the weld boundary line 42 with terminal end fitting component 36.

Guard pipe 26 is fabricated from the same structural materials as those of process pipe 12, and the radial wall thickness of guard pipe 26 is comparable to, and preferably even somewhat larger than, the radial wall thickness of process pipe 12 in view of the fact that a larger diameter pipe or conduit is subjected to increased radially oriented pressure loading. In this manner, guard pipe 26 can adequately withstand the temperatures and pressures normally exhibited by the process fluid within process pipe 12 should a rupture condition occur within process pipe 12 whereby the process fluid effluent would be released or discharged through the ruptured portion of process pipe 12 into the annular space 30 defined between process pipe 12 and guard pipe 26, and thereby be impressed upon the walls of guard pipe 26. In view of the foregoing, it is thus appreciated that under postulated pipe rutpure conditions occurring within process pipe 12, the guard pipe 26 will in fact contain the discharged or released process fluid effluent from ruptured process pipe 12 whereby such effluent will not in fact be discharged into vital areas of the reactor facility as has been generally designated at 48. As has been noted hereinabove, it is particularly critical that guard pipe 26 extend upstream of, or beyond, the weld boundary line 24 defined between process pipe 12 and the pressure vessel nozzle pipe end fitting 20 because in this manner, all sections or portions of process pipe 12 within which postulated ruptures could occur within the vicinity of pressure vessel 14 are in fact protected. Similarly, in view of the fact that the guard pipe is disposed concentrically relative to process pipe 12 throughout its length up to and beyond the reactor facility building wall 32 so as to completely encase the same, the critical reactor control area 48 is in fact protected. As an additional precaution, guard pipe 26 likewise extends axially downstream of process pipe 12 within the vicinity of fluid conduit 46, and is butt-welded to terminal end fitting component 36, exteriorly of the reactor facility building line or wall 32, so as to again insure that the entire process pipe 12 is in fact encased or enclosed within the protective guard pipe 26, including the terminal ends of the process pipe 12. It is also to be noted that in conjunction with the relative disposition of the weld lines or boundaries 24 and 28 at the pressure vessel end of the system, as well as the similar disposition of the weld lines or boundaries 42 and 44 at the building wall end of the system, such staggered weld lines or boundaries facilitates the welding processing by means of automatic equipment, as well as facilitating the use of current, state-of-the-art inspection apparatus utilized for detecting flaws within the weld areas.

In addition to the aforenoted process fluid containment function of the guard pipe under postulated process pipe rupture conditions, the guard pipe 26 will also restrain pipe whipping attendant a postulated process pipe rupture. Under such rupture conditions, the action of the effluent or released process fluid will cause an oppositely directed reaction of the ruptured process pipe known as pipe whipping. It is therefore to be appreciated that guard pipe 26 will be fabricated with sufficient strength and stress characteristics so as to be capable of adequately withstanding such initial and sudden dynamic load effects of the process fluid effluent as well as similar load effects from the initially whipping process pipe. As the discharged process fluid effluent fills the annular space 30 defined between the guard and process pipes, however, such initially unstable dynamic load are neutralized and eliminated whereupon steady-state, balanced loads are now impressed upon the guard and process pipes. Normal functioning of all systems can therefore continue until the system can actually be repaired.

In accordance with an additionally important safety feature of the present invention, leak detection means 50 can be utilized for monitoring the annular space 30 defined between the process pipe 12 and the guard pipe 26 in an effort to detect the commencement of a rupture condition either within the process pipe 12 or guard pipe 26. The leak detection apparatus 50 can conventionally include means for pressurizing the annular space 30 with a suitable gaseous medium, the level of pressurization being greater than that of the atmospheric pressure prevailing within the reactor facility area 48 yet less than that prevailing within process pipe 12. As a result of this leak detection system, it is apparent that should a crack, fracture, or rupture occur, for example, within process pipe 12 whereby process fluid will escape from process pipe 12 into annular space 30, the leak detection apparatus 50 will detect an increase in the pressure level of the medium within annular space 30 thereby indicating a crack, fracture, rupture, or the like within process pipe 12. On the other hand, should a crack, fracture, rupture, or the like occur within guard pipe 26, the leak detection gaseous medium within annular space 30 will escape into the reactor facility area 48 whereby the leak detection apparatus 50 will record or indicate a decrease in the pressure level prevailing within annular space 30 thereby signalling the presence of a rupture, crack, fracture, or the like within guard pipe 26. Suitable repairs can then of course be made to the particularly cracked, fractured, or ruptured pipe whereby, again, enhanced safety within the reactor facility has been achieved.

It is lastly to be noted that in view of the particular process fluid being handled and conveyed by process pipe 12 from pressure vessel 14 to fluid conduit 46, the process pipe 12 will be periodically subjected to thermal expansion and contraction cycles, and therefore means within the aforenoted self-supporting pipe rupture and whip restraint system of the present invention must also be provided for accommodating such thermal cycles, particularly, the thermal expansion of the inner process fluid pipe relative to the outer guard pipe. Accordingly, the fluid path of the process fluid, as defined by means of the process fluid pipe 12, encompasses at least one 90° elbow bend as indicatd at 52. The guard pipe 26 also includes a 90° elbow bend configuration matching that of process pipe 12 so as to remain concentrically disposed with respect to process pipe 12. Under thermal expansion conditions, however, process pipe 12 will tend to radially expand as well as longitudinally expand. Radial expansion of process pipe 12 relative to guard pipe 26 will be accommodated by means of annular space 30 defined between pipes 12 and 26, particularly within the linear, non-elbow regions of the system. With respect to the longitudinal expansion of the inner process pipe 12 relative to the outer guard pipe 26, particularly within the linear, non-elbow regions of the process pipe 12, such linear regions of the process pipe 12 will tend to linearly expand into the elbow region whereby the entire elbow region of the system, throughout the 90° elbow bend area, will likewise accommodate such linear expansion of the process pipe linear sections. In particular, as viewed in the sole FIGURE, the process pipe elbow section will tend to exhibit a resultant movement in what may be considered the northeasterly direction through annular space 30 toward the elbow section of guard pipe 26. Consequently, it is seen that the present inventive system can accommodate thermal expansion of the process pipe without the requirement for auxiliary expansion-accommodation means, such as, for example, conventional expansion joints, expansion bellows, and the like.

Thus, it may be seen that the present invention has important advantages over known prior art pipe rupture and whip restraint systems in that the system of the present invention is self-supporting and self-contained without the requirement for auxiliary whip restraint support systems which are conventionally massive and spatially restrictive. In addition, the present inventive system can advantageously accommodate the initial unstable dynamic loads attendant a pipe rupture and subsequently re-establish quiescent steady-state stable conditions while interiorly containing the process pipe fluid effluent, whereby critical and vital control devices, systems, panels, and the like of the reactor facility are not exposed to pipe-whipping and high-pressure effluent forces.

Obviously, many modifications and variations of the present invention are possible in light of the foregoing teachings. It is therefore to be understood that within the scope of the appended claims, the present invention may be practiced otherwise than as specifically described herein.

I claim:

1. A pipe rupture and whip restraint system, comprising:

first pipe means for conveying a fluid within an area to be protected from whipping of said first pipe means in response to a pipe rupture condition which can occur at any axial position along the longitudinal extent of said first pipe means within said area to be protected; and second pipe means, concentrically disposed about said first pipe means in a radially spaced fashion so as to define a free annular space between said first and second pipe means into which said fluid can enter under said pipe rupture condition and having its opposite ends integrally fixed to the opposite ends of said first pipe means such that said ends of said first and second pipe means are joined together to form single-piece, unitary structures whereby said first pipe means will be entirely encased within said second pipe means in a fluid-tight and load-bearing manner, for withstanding dynamic load forces attendant a rupture of said first pipe means, for containing said fluid within said annular space defined between said first and second pipe means, and for physically and stably restraining the whipping of said first pipe means within said second pipe means under said pipe rupture condition of said first pipe means by permitting said fluid to enter said annular space defined between said first and second pipe means.

2. A pipe rupture and whip restraint system as set forth in claim 1, additionally comprising:
leak detecting means operatively associated with said annular space defined between said first pipe means and said second pipe means.

3. A pipe rupture and whip restraint system as set forth in claim 1, wherein:
said first pipe means is a high-pressure steam line; and said fluid is high-pressure steam.

4. A pipe rupture and whip restraint system as set forth in claim 3, further comprising:
means defined within said system for accommodating the thermal expansion of said first pipe means relative to said second pipe means.

5. A pipe rupture and whip restraint system as set forth in claim 4 wherein:
said thermal expansion accommodating means comprises a 90° elbow bend defined within both of said first pipe means and said second pipe means,
whereby longitudinal thermal expansion of said first pipe means relative to said second pipe means is accommodated within said 90° elbow bend portion of said second pipe means.

6. A pipe rupture and whip restraint system as set forth in claim 3 further comprising:
a steam generator pressure vessel; and
nozzle means interconnecting said first pipe means to said steam generator pressure vessel.

7. A pipe rupture and whip restraint system as set forth in claim 6, wherein:
said second pipe means is connected to said steam generator pressure vessel through means of said nozzle means.

8. A pipe rupture and whip restraint system as set forth in claim 7, wherein:
the interconnection boundary defined between said second pipe means and said nozzle means is upstream of the interconnection boundary defined between said first pipe means and said nozzle means,
whereby the terminal end of said first pipe means is encased within said second pipe means.

9. A pipe rupture and fluid containment system, comprising:
first pipe means for conveying a fluid within an area to be protected from said fluid under a pipe rupture condition which can occur at any axial position along the longitudinal extent of said first pipe means within said area to be protected; and
second pipe means, concentrically disposed about said first pipe means in a radially spaced fashion so as to define a free annular space betwen said first pipe means and said second pipe means into which said fluid can flow under said pipe rupture condition and having its opposite ends fixedly connected to the opposite ends of said first pipe means such that said ends of said first and second pipe means are joined together to form singlepiece, unitary structures whereby said first pipe means will be entirely encased within said second pipe means in a fluid-tight and load-bearing manner, for withstanding dynamic load forces attendant a rupture of said first pipe means and for containing said fluid issuing from said ruptured first pipe means and entering said annular space defined between said first and second pipe means so as to prevent said issuing fluid from reaching said protected area under said pipe rupture condition at any axial position along the longitudinal extent of said first pipe means within said area to be protected.

10. A pipe rupture and fluid containment system as set forth in claim 2, additionally comprising:
leak detecting means operatively associated with said annular space defined between said first pipe means and said second pipe means.

11. A pipe rupture and fluid containment system as set forth in claim 2, wherein:
said first pipe means is a high-pressure steam line; and said fluid is high-pressure steam.

12. A pipe rupture and fluid containment system as set forth in claim 11, wherein:
means defined within said system for accommodating the thermal expansion of said first pipe means relative to said second pipe means.

13. A pipe rupture and fluid containment system as set forth in claim 1, wherein:
said thermal expansion accommodating means comprises a 90° elbow bend defined within both of said first pipe means and said second pipe means,
whereby longitudinal thermal expansion of said first pipe means relative to said second pipe means is accommodated within said 90° elbow bend portion of said second pipe means.

14. A pipe rupture, whip restraint, and fluid containment system, comprising:
first pipe means for conveying a fluid within an area to be protected from said fluid and whipping of said first pipe means under a pipe rupture condition which can occur at any axial position along the longitudinal extent of said first pipe means within said area to be protected; and
second pipe means, concentrically disposed about said first pipe means in a radially spaced fashion so as to define with said first pipe means a free annular chamber between said first and second pipe means into which said fluid can flow under said pipe rupture condition, and having its opposite ends integrally connected to the opposite ends of said first pipe means in a fluid-tight and load-bearing manner such that a substantially onepiece dual-concentric unitary structural pipe is formed by said first and second pipe means for containing said fluid issuing from said first pipe means and entering said annular chamber so as to prevent said issuing fluid from reaching said protected area, for withstanding dynamic load forces attendant a rupture of said first pipe means, and for restraining the whipping of said first pipe means within said second pipe means by permitting said fluid to enter said annular chamber defined between said first and second pipe means, under said pipe rupture condition at any axial position along the longitudinal extent of said first pipe means within said area to be protected.

15. A pipe rupture, whip restraint, and fluid containment system as set forth in claim 14, additionally comprising:
   leak detecting means operatively associated with said annular chamber defined between said first and second pipe means for determining changes in pressure existing within said annular chamber.

16. A pipe rupture, whip restraint, and fluid containment system as set forth in claim 14, wherein:
   said first pipe means is a high-pressure steam line; and
   said fluid is high-pressure steam.

17. A pipe rupture, whip restraint, and fluid containment system as set forth in claim 14, further comprising:
   a steam generator pressure vessel; and
   nozzle means for interconnecting said first and second pipe means to said steam generator pressure vessel,
   said nozzle means having a single wall portion at its upstream and integrally connected to said steam generator pressure vessel, and a dual-wall portion, defined by two concentric, radially spaced wall portions, at the downstream end thereof for integrally mating with said concentric, radially spaced, first and second pipe means.

18. A pipe rupture, whip restraint, and fluid containment system as set forth in claim 17, wherein:
   the interconnection boundary defined between said second pipe means and said nozzle means is located upstream of the interconnection boundary defined between said first pipe means and said nozzle means such that the terminal end of said first pipe means is disposed internally within said second pipe means.

19. A pipe rupture, whip restraint, and fluid containment system as set forth in claim 14, further comprising:
   means defined within said system for accommodating thermal expansion of said first pipe means relative to said second pipe means.

20. A pipe rupture, whip restraint, and fluid containment system as set forth in claim 19, wherein:
   said thermal expansion accommodating means comprises a 90° elbow bend defined within both of said first and second pipe means.

* * * * *